2,921,248

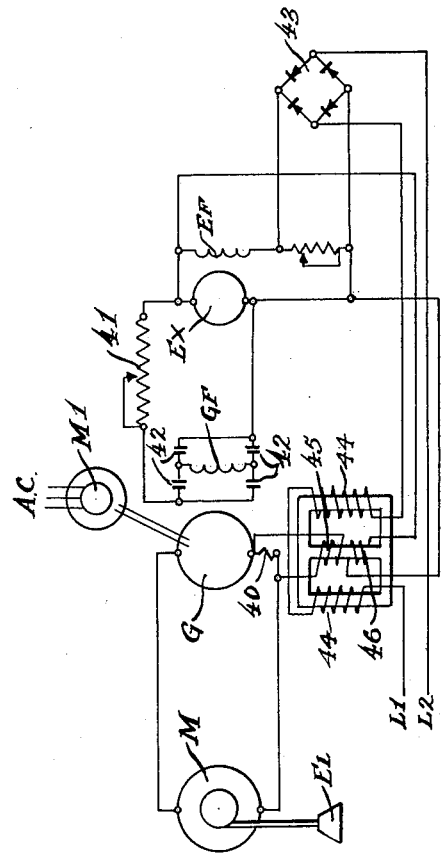

MOTOR CONTROL SYSTEM

Henry Duvall James, Pittsburgh, Pa., assignor of twenty-five percent to William J. Ruano, Pittsburgh, Pa.

Original application June 21, 1951, Serial No. 232,687. Divided and this application March 26, 1956, Serial No. 573,694

1 Claim. (Cl. 318—144)

The present invention relates to improvements in motor control systems and, more particularly, to systems for controlling the load or speed, or both, of an electric motor. The present application is a division of my pending application Serial No. 232,687, filed June 21, 1951, entitled Motor Control Systems.

Systems commonly used for controlling electric motors generally employ electronic tubes and rotating dynamo electric machines which require continuing maintenance. Frequent replacement of parts, particularly electronic tubes, is required, which makes the systems somewhat undesirable, particularly when subjected to vibration and other disturbances. While certain control systems have been employed which use magnetic amplifiers, also referred to as saturable core reactors, these have been rather complicated. For example, magnetic amplifiers have been used in variable voltage systems, which systems involve not only considerable cost because of the large number of component parts thereof, but which require a high degree of technical skill for upkeep and repair, which is usually beyond the capabilities of the average electrical repairman.

An object of the present invention is to provide novel control systems employing magnetic amplifiers, which systems are devoid of the above named disadvantages and which afford optimum and maximum utilization of many heretofore unrecognized and highly desirable characteristics of magnetic amplifiers.

A more specific object of the present invention is to provide novel control means employing magnetic amplifiers for controlling the load or speed, or both, of an electric motor, which control means involve simple control circuits that are rugged and have a minimum number of parts that are easy for a workman to understand and maintain, and which circuits are devoid of electronic tubes and moving parts.

Other objects and advantages of the present invention will become apparent from a study of the following description taken with the accompanying drawings wherein:

The figure shows a speed control system for elevators and mine and skip hoists with a magnetic amplifier control embodying the principles of the present invention.

A magnetic amplifier, sometimes referred to as a saturable core reactor, is a special type of transformer generally having two sets of windings, the main or power windings energized by alternating current and the control windings energized by direct current. One of the elementary types of magnetic amplifiers is the three legged type consisting of a magnetic core having a pair of power windings wound on the outer legs energized by alternating current and a control winding on the central leg energized by direct current. The alternating current windings or coils on the outer legs are connected either in series or in parallel so that the alternating current flux passes through the outside iron core path but not through the center leg which carries the direct current coil. The direct current coil on the center leg sets up a saturating flux in the outside legs. Thus by increasing the control current in the direct current coil, the ampere turns on the center leg are increased, raising the degree of saturation and lowering the effective permeability of the outer legs. Consequently, the reactance of the A.C. coils is reduced, decreasing the total impedance in the A.C. current, hence increasing the load current and voltage. The iron core is operated close to its saturation point to make it sensitive to control. As stated above, the current flowing through the A.C. windings is controlled by the magnetism in the iron core, the greater the saturation in this core, the less the impedance of the A.C. circuit and the higher the current in the main or power windings, that is, more control current causes current saturation of the iron core which, in turn, causes greater current flow through the main or A.C. windings. A small change in D.C. control current can cause a very large change in A.C. current when the core is operated close to the saturation point.

Motor control systems are generally directed to the control of load or speed of the motor or both. This may be obtained with adjustable resistors inserted in the armature or field circuit of a direct current motor or a resistor in the secondary circuit of a wound rotor induction motor. When a direct current working motor is served by an individual generator with its own exciter, the motor can have its load or speed or both adjusted by controlling the field of the exciter. In many applications, the magnetic amplifier can control load, speed, voltage, etc., by a plurality of control windings, properly connected to the wiring system.

In accordance with the present invention, magnetic amplifiers are embodied and connected in various control systems in such a way as to make maximum utilization of some of the lesser known and heretofore unused characteristics of magnetic amplifiers and by making the control systems extremely simple and accurate, embodying a minimum number of parts to reduce cost and permit elementary understanding and maintenance of the circuit by an ordinary mechanic rather than requiring a highly skilled electrical serviceman.

The figure shows a speed control system for elevators as well as mine and skip hoists. The control system is such that it is readily adaptable as an addition to existing installations so as to readily convert them for control by a magnetic amplifier. A motor M which drives an elevator E1 (or a mine or skip hoist) has its armature connected in series with the armature of a generator G and with commutating field winding 40 of the generator. The generator is driven by a motor M1 energized by a suitable alternating current source of supply. The generator has a field winding GF which is energized by an exciter EX through a variable resistor 41 and through reversing switches 42. The exciter, in turn, has an exciter field winding EF which is fed by direct current from the output of a rectifier 43, which rectifier is connected in series with the power coils 44 of the magnetic amplifier. The magnetic amplifier has a pair of control coils 45 and 46 wound on the central leg. Control coil 45 is connected across the commutating winding 40, whereas control coil 46 is in circuit relationship with the generator exciter EX. Rectifier 43 passes current corresponding to the current flowing through coils 45 and 46, which controls the magnetism of the magnetic amplifier and exciter voltage. The ampere turns of coil 45 must always be less than the ampere turns of coil 46.

In operation, with positive load, control coils 45 and 46 are energized in the same direction and the excitation of generator exciter field winding EF increases with the load to keep constant motor speed. More specifically, as the load increases, there will be an increase in current flow through power coils 44 which, in turn, increases the amount of current and excitation of exciter field EF.

With negative load, the motor becomes a generator and returns power to the line. Control coil 45 is reversed and opposes control coil 46 so as to reduce the generator voltage and keep constant speed of the load by returning power to the line.

Thus it will be seen that I have provided a control system for regulating speed of an electric motor which control system embodies magnetic amplifiers connected in such way as to afford maximum utilization of the many desirable characteristics of such magnetic amplifiers, also, so as to make the control system extremely simple and rugged and embodying a minimum number of parts so that the cost will be low and so that its upkeep will be within the purview of an average technician rather than requiring a highly skilled electrical technician; furthermore, I have provided control system which is devoid of electronic tubes and moving parts, making the system truly reliable in operation for long periods of time, thus giving the system considerably longer life than that of commonly used systems.

While I have illustrated and described a single specific embodiment of my invention, it will be understood that this is by way of illustration only, and that various changes and modifications may be made within the contemplation of my invention and within the scope of the following claim.

I claim:

A hoist speed control system comprising a motor including an armature, a hoist driven by said motor, a generator having an armature in loop circuit with said motor armature, a magnetic amplifier comprising a control input coil controlled by generator armature current and power output coils, said generator having a shunt field coil, an exciter generator and reversing means for selectively passing current from said exciter generator in opposite directions through said shunt field coil, and a field coil for said exciter generator controlled partially by current flow through a second control input coil wound oppositely to said first control input coil on a common leg of the core of said magnetic amplifier for varying the strength of said generator shunt field winding, said generator being driven by an A.C. motor which, under negative load conditions, absorbs negative load when the field of the generator is increased sufficiently to drive said A.C. motor above synchronism, and under which negative load conditions said hoist driving motor when lowering the load becomes a generator and said generator becomes a motor.

References Cited in the file of this patent

UNITED STATES PATENTS

| | | |
|---|---|---|
| 2,519,339 | Avery | Aug. 22, 1950 |
| 2,627,597 | Johansson | Feb. 3, 1953 |
| 2,677,085 | Sikorra | Apr. 27, 1954 |